Patented Feb. 28, 1928.

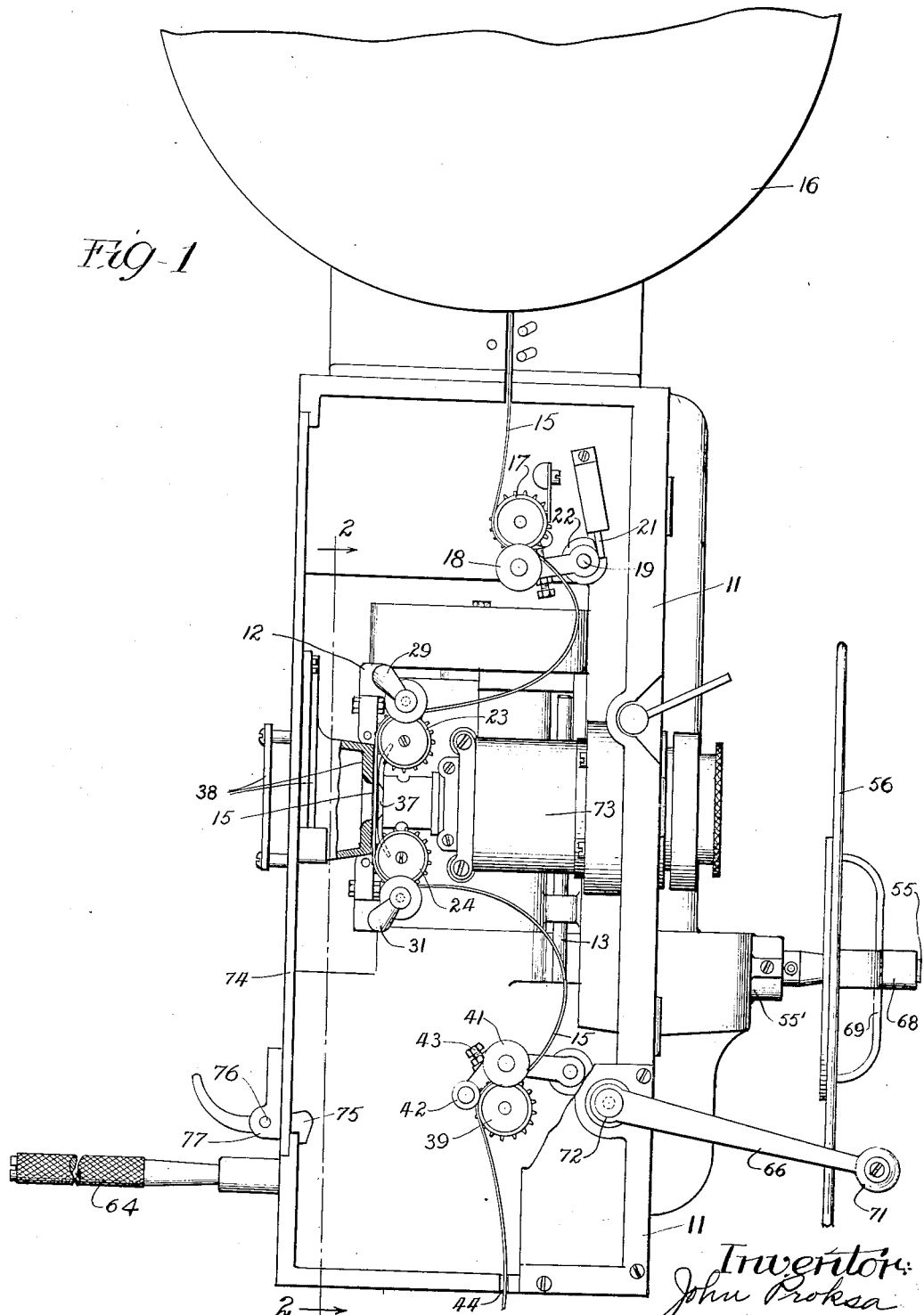

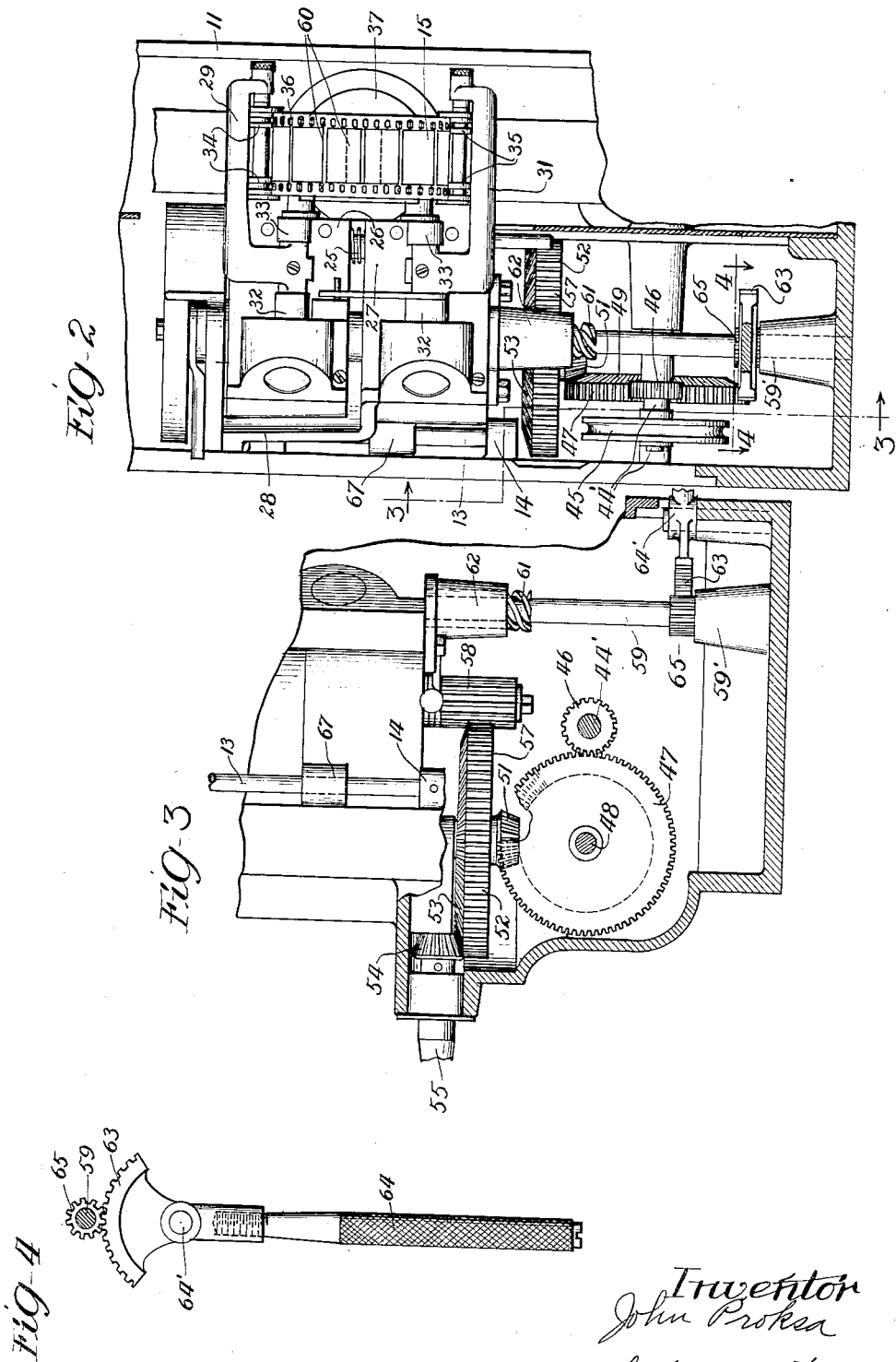

1,660,656

UNITED STATES PATENT OFFICE.

JOHN PROKSA, OF CHICAGO, ILLINOIS, ASSIGNOR TO HELIOS CORPORATION, OF CHICAGO, ILLINOIS, A CORPORATION OF DELAWARE.

MOTION-PICTURE-PROJECTING APPARATUS.

Application filed September 26, 1921. Serial No. 503,133.

This invention relates in general to motion picture projecting or exhibiting machines in which a translucent film is passed by an intermittent motion before a light projecting aperture and has more particular reference to means for positioning or framing a given portion of the film before said aperture for the purpose of presenting the pictures evenly and in desired position on an exhibiting screen.

The invention is particularly adapted for use with that type of film feeding mechanism set forth in my previous Patent No. 1,170,991 on film feeding mechanism, issued February 8, 1916, and in which the driving shaft for the feeding mechanism is vertically disposed in a slidable carriage.

A principal object of the invention is the provision of means for vertically shifting the slidable carriage of such a film feeding mechanism without disturbing the operative connection between the driving shaft referred to and the main driving gear by which it is driven. A further object of the invention is the provision of means for driving the film feeding mechanism in synchronism with a rotary shutter positioned in front of the light projecting aperture, regardless of the vertical position of the carriage.

Numerous other objects and advantages of the invention will be apparent as it is better understood from the following description when considered in connection with the accompanying drawings illustrating a preferred embodiment thereof.

Referring to the drawings:

Figure 1 is a side elevation of the film feeding portion of a moving picture projecting machine, a part of the casing being removed for convenience in illustration.

Fig. 2 is a partial vertical section taken substantially on the line 2—2 in Fig. 1 and comprising a rear view of certain portions of the apparatus.

Fig. 3 is a sectional view taken substantially in the line 3—3 of Fig. 2 and showing a portion of that side of the apparatus opposite that shown in Fig. 1.

Fig. 4 is a detailed view of the shifting lever taken substantially on the line 4—4 in Fig. 2.

Upon the drawings disclosing an illustrative embodiment of the invention, the reference character 11 indicates a main frame which is stationarily positioned upon a suitable support (not shown), as will be readily understood, and encases the film feeding mechanism indicated generally by the reference character 12. This feeding mechanism is slidably mounted in the frame having vertical movement upon guide rods 13 secured in bearings 14 projecting from the stationary frame. The film 15 is fed from a supply spool positioned in a drum disk 16 and is guided over a sprocket 17 with which it is held in contact by grooved rollers 18 which are pivoted at 19 and adapted to be held in contact with the sprocket 17 by a spring 21 seated in a cut-away portion of a pivotal disk 22. The film is then guided over two driven sprockets 23 and 24 between which it is tensioned by a spring 25 exerting yieldingly opposed stress upon the separable portions 26 and 27 of the carriage 28 upon which portions the sprockets are respectively mounted. The means just referred to for tensioning the film is not shown in detail nor is further description thereof deemed necessary since it is fully shown and described in my earlier patent hereinbefore referred to. It should be noted however that both the sprockets 23 and 24 are driven in intermittent fashion by motion converting mechanism mounted in said carriage and driven by a vertical shaft extending through the carriage and movable therewith and having operative connection with a source of power having fixed position in the main frame. Two arms 29 and 31 are pivotally secured upon the carriage 28 between bearings 32 and 33, through which the sprocket carrying shafts extend, and these arms carry grooved rollers 34 and 35 adapted to hold perforations 36 upon the edges of the film upon the teeth of the sprocket wheels, though it should be observed that this is not for the purpose of tensioning the film, which is otherwise accomplished, in a manner heretofore referred to, but is merely for the purpose of maintaining a connection between the film and the sprockets.

Between the two sprockets 23 and 24 is a light projecting aperture 37 and immediately behind said aperture is positioned the lighting apparatus by means of which the pictures upon the translucent film are projected on to the screen, this lighting apparatus not being shown, since it forms no part of the invention, and means for protecting the frame and concentrating the light upon the aperture being generally indicated by the reference character 38. From the sprocket 24 the film is guided about still another sprocket 39 with which it is held in contact by pivoted rollers 41 and 42 which are adjustable by means of a set screw 43. Thence the film is directed through a slot 44 in the lower frame and onto a receiving spool positioned beneath the apparatus shown in the drawing, in the well-known manner.

The mechanism for operating the machine is shown in detail in Figs. 2 and 3 and consists of gearing to be hereinafter described and a main power shaft 48 driven by means of a pulley (not shown) suitably connected with a motor or other source of power normally utilized for this purpose. A shaft 44' carries a pinion 46 which is in constant mesh with a large gear 47 carried on the shaft 48, and a pulley 45 for operating a film take-up spool (not shown), said gear 47 having also a beveled portion 49 for co-operation with a bevel gear 51. The gear 51 is secured to a vertical shaft upon which is also carried a main driving gear 52. This gear has a beveled portion 53 meshing with a bevel gear 54 which is carried upon a shutter operating shaft 55 so that a shutter 56 is rotated in timed relationship with said main gear. The main gear has also peripheral teeth 57 which engage a pinion 58 fixed upon the lower end of the vertical driving shaft of the film feeding mechanism.

As heretofore stated, the feeding mechanism and the shaft and pinion just referred to are mounted upon a vertically slidable carriage, this arrangement being necessary to permit the framing of a desired portion of the film, containing a single picture 60, shown in irregular position in full lines and in regular position in dotted lines in Fig. 2, before the light projecting aperture 37 prior to beginning operation of the machine. To shift the carriage upon the rods 13, I have provided a shaft 59 with bearings in the main frame at 59' and having a spiral gear or worm 61 on the upper end thereof adapted to co-operate with a threaded projection 62 on the carriage to raise and lower the same when the shaft is turned by means of a segmental gear 63 manually operable by means of a lever 64 pivoted at 64' and meshing with a pinion 65 on said shaft.

In other types of machines the driving shaft for the film feeding mechanism is normally arranged horizontally in the carriage and operated by vertical gears in a now well known manner. Due to the vertical arrangement of the driving shaft in this type of apparatus, however, the methods heretofore employed for maintaining operative connection between the fixed and shifting portions of the apparatus are not applicable and I have provided in their stead shifting mechanism including the elongated pinion 58 adapted to maintain operative connection with the gear teeth 57 irrespective of the vertical position of the carriage.

It is essential that the driving shaft for the film feeding mechanism be driven in synchronism with the shutter 56 in order that the light may be obstructed from the screen by the blades or wings of the shutter during the transition from one to another of the successive pictures on the film. To this end my invention provides means for maintaining the pinion 58 and the bevel gear 54 in constant mesh with the driving gear 52 regardless of the position of the carriage, thus insuring a fixed time relationship between the movement of the film and the rotation of the shutter. The shutter shaft 55 has bearings 55' in the frame or casing 11 and the shutter is provided with suitable bearing and bracing members 68 and 69.

A crank handle 66 having a knob 71 is provided for manipulation of the main shaft 48, with which it is connected at 72, to move short portions of the film through the machine for repairs and the like when the power is disconnected.

A fixed tubular casing 73 is provided to define the aperture 37, and particular illustration or description of it or the lenses and other structure with which this invention is not connected are omitted.

The back wall 74 of the casing is removable to permit inspection or repairs and is adapted to be locked in closed position by a latch 75 pivoted at 76 to a boss or projection 77 protruding from said wall.

It will be understood that my invention is not limited to any particular type of slidable carriage and that other means of guiding the carriage, as for instance a dovetail connection between said carriage and the main frame, could be employed instead of the guide rods 13 and the bosses 67, if desired.

It is thought that the invention and many of its attendant advantages will be understood from the foregoing description and it will be apparent that various changes may be made in the form, construction and arrangement of the parts, without departing from the spirit and scope of the invention claimed or sacrificing all of its material advantages, the form hereinbefore described being merely a preferred embodiment thereof.

I claim:

1. In a motion picture projecting machine, the combination of a fixed unit including a power shaft, a horizontally positioned gear, means for transmitting power from said shaft to said gear, a vertically shiftable unit adjustably mounted on said fixed unit, said shiftable unit carrying film feeding mechanism, an elongated pinion mounted on said shiftable unit for operating said film feeding mechanism, said elongated pinion adapted to mesh with said horizontally positioned gear irrespective of the position of said shiftable unit.

2. In a motion picture projecting machine, the combination of a fixed unit including a power driven rotary gear and means for transmitting power to said gear, a vertically shiftable unit slidably supported upon said fixed unit, said shiftable unit carrying film feeding mechanism, an elongated rotary pinion mounted on said shiftable unit and operating said film feeding mechanism, said pinion adapted to mesh with said power driven gear to transmit motion to the film feeding mechanism irrespective of the vertical position of said shiftable unit, a rotary shutter driven by said power driven gear in synchronism with said film feeding mechanism, means carried by said fixed unit for moving said shiftable unit with respect to said fixed unit, said means preventing relative movement between said units except when said means is positively actuated.

3. In a motion picture projecting machine, the combination of a fixed unit including a horizontally disposed power shaft, a driving gear mounted on said power shaft, a vertically disposed shaft, a driven gear mounted on said vertically disposed shaft, a pinion rigidly connected to said driven gear and adapted to mesh with said driving gear, a vertically shiftable unit adjustably mounted on said fixed unit, said shiftable unit carrying film feeding mechanism, an elongated rotary pinion mounted on said shiftable unit for operating said film feeding mechanism, said elongated pinion adapted to mesh with said driven gear irrespective of the vertical position of said shiftable unit; a rotary screw shaft supported by said fixed unit adapted to co-operate with an internally screw threaded member carried by said shiftable unit to move said shiftable unit to selected vertical positions and to frictionally hold it in such positions.

JOHN PROKSA.